United States Patent [19]

Hirota et al.

[11] Patent Number: 5,041,949

[45] Date of Patent: Aug. 20, 1991

[54] DUST-RESISTANT VEHICLE HEADLAMP VENTILATION SYSTEM HAVING A MAZE BOX

[75] Inventors: Takashi Hirota; Masaji Sekido, both of Hadano, Japan

[73] Assignee: Stanley Electric Co., Ltd., Tokyo, Japan

[21] Appl. No.: 521,092

[22] Filed: May 9, 1990

[30] Foreign Application Priority Data

May 15, 1989 [JP] Japan ........................ 1-55487

[51] Int. Cl.[5] ........................ B60Q 1/00; F21V 33/00

[52] U.S. Cl. ........................ 362/61; 362/96; 362/294; 362/345; 362/373

[58] Field of Search ........................ 362/61, 80, 294, 373, 362/345, 96, 267

[56] References Cited

U.S. PATENT DOCUMENTS 4,739,458 4/1988 Hamayoshi et al. ................ 362/294
4,755,917 7/1988 Bals et al. ........................ 362/294
4,796,163 1/1989 Dressler ........................ 362/80
4,862,337 8/1989 Ohshio et al. ........................ 362/80
4,931,912 6/1990 Kawakami et al. ................ 362/294

FOREIGN PATENT DOCUMENTS 2619343 2/1989 France ........................ 362/80

*Primary Examiner*—Ira S. Lazarus
*Assistant Examiner*—D. M. Cox
*Attorney, Agent, or Firm*—Frishauf, Holtz, Goodman & Woodward

[57] ABSTRACT

A vehicle headlamp ventilation system includes a dust-resistant maze box. The maze box comprises a pair of rubber hose connections provided on opposite ends of a box, the box having an opening portion at one surface thereof, and ribs extending from the bottom surface of the box to the opening portion and which define a zig-zag flow path inside the box to prolong a spatial distance between the pair of rubber hose connections. The ribs are provided interiorly of the box, and the opening portion is closed by a cover which contacts the upper edges of the ribs. The dust-resistant maze box may also be formed integrally with a housing of a vehicle headlamp with the bottom surface of the box common with the housing of the headlamp.

6 Claims, 2 Drawing Sheets

DUST-RESISTANT VEHICLE HEADLAMP VENTILATION SYSTEM HAVING A MAZE BOX

BACKGROUND OF THE INVENTION

1. Field of the Invention

The present invention relates to a ventilation system of a headlamp for a vehicle, and more specifically to a ventilation system having a dust-resistant maze box.

2. Prior Art

FIGS. 3 and 4 show an example of a ventilation system of a conventional headlamp 30 for a vehicle. In the state wherein a headlamp 30 for a vehicle is mounted on a vehicle, two rubber hose connections 31 which extend into the chamber of the headlamp housing (see FIG. 4) are provided at two points, one close to the upper end and the other close to the lower end. Rubber hoses 32, which are curved or interiorly provided with ribs 32*a* (FIG. 4) to enhance the dust-resistant effect, are connected to the rubber hose connections 31.

However, in the above-described conventional ventilation system, the aforementioned rubber hose 32 has a limitation in length due to the dimensional restrictions when the headlamp 30 is mounted on the vehicle (not shown).

When the rubber hose 32 is received within the limited space, there is no room or area where dust in the atmosphere precipitates, and the dust is sucked into the headlamp 30, thus failing to provide a sufficient dust-resistant performance. For this reason, dust moves into the headlamp 30 to produce a problem of deterioration in the performance due to, for example, blurring of a reflecting mirror and a lens.

An object of the present invention is to overcome this disadvantage of the conventional ventilation construction.

SUMMARY OF THE INVENTION

In order to achieve the above-described object, the present invention provides a dust-resistant maze box connected to a vehicle headlamp, characterized in that a pair of hose connections are provided on the ends of a box having a bottom surface and an openinq portion at one surface thereof which is opposite the bottom surface. Ribs extend from the bottom surface of said box to said opening portion and alternately extend from opposite sides of the box to prolong a spatial distance between said pair of hose connections, the ribs being provided interiorly of said box, and said opening portion being closed by a cover. With this arrangement, a ventilation passage can be extended, and the dust-resistance effect can be obtained even within the restricted dimension for mounting as previously mentioned, thus solving the problem as noted above with respect to the prior art.

DETAILED DESCRIPTION OF THE INVENTION

Figure 1:
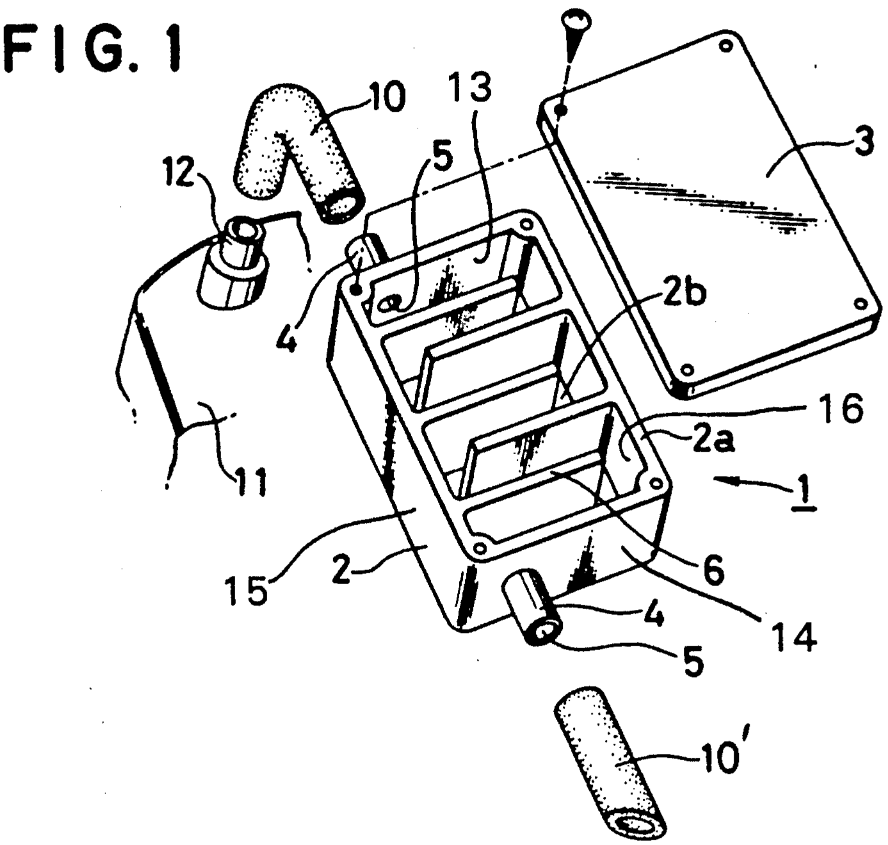
FIG. 1 is a perspective view showing one embodiment of a dust-resistant maze box of a headlamp ventilation system according to the present invention.

The present invention will be described in detail with reference to the embodiments shown in the drawings.

In FIG. 1, reference numeral 1 designates a dust resistant maze box, which comprises a box 2 and a cover 3. The box 2 is a rectangular box-like body having an opening portion 2*a* in one surface, for example, an upper surface thereof. Preferably, a pair of substantially tubular rubber hose connections 4 to which rubber hoses 10 and 10′ are connected are respectively provided on the opposite ends 13, 14 of box 2, the rubber hose connections 4 extending through to the interior of the box 2 through holes 5 provided in the centers thereof.

Within the box 2 are provided a plurality of ribs 6 alternately interleaved and projected from the pair of opposed sides 15, 16 of the box 2. The ribs 6 end short of their respective opposed sides, and have a height extending from the opening portion 2*a* to the bottom surface 2*b* of the box 2. When the opening portion 2*a* is closed by the cover 3, the tops of the ribs 6 come into contact with the cover 3, whereby a long wicker basket-like spatial distance (i.e. a zig-zag air flow path) is formed between the holes 5.

When the dust-resistant maze box 1 constructed as described above is mounted on a vehicle headlamp 11, a rubber hose connection 12 on the side of the housing of the vehicle headlamp 11 and the rubber hose connection 4 provided on the end 13 of the dust-resistant maze box 1 are connected together by means of the rubber hose 10. The rubber hose 10′ is connected to the rubber hose connection 4 on the other end 14 of the box 2 and can be extended.

Since the ventilation system of the vehicle headlamp 11 has the aforesaid dust-resistant maze box 1 disposed therein, even with the limited space for mounting in the vehicle body, the ventilation flow path can be effectively prolonged due to the extended zig-zag path in the dust box, and dust contained in open air is precipitated into the dust-resistant maze box 1 during the prolonged flow therethrough to lower a proportion of contamination of the vehicle headlamp 11.

Figure 2:
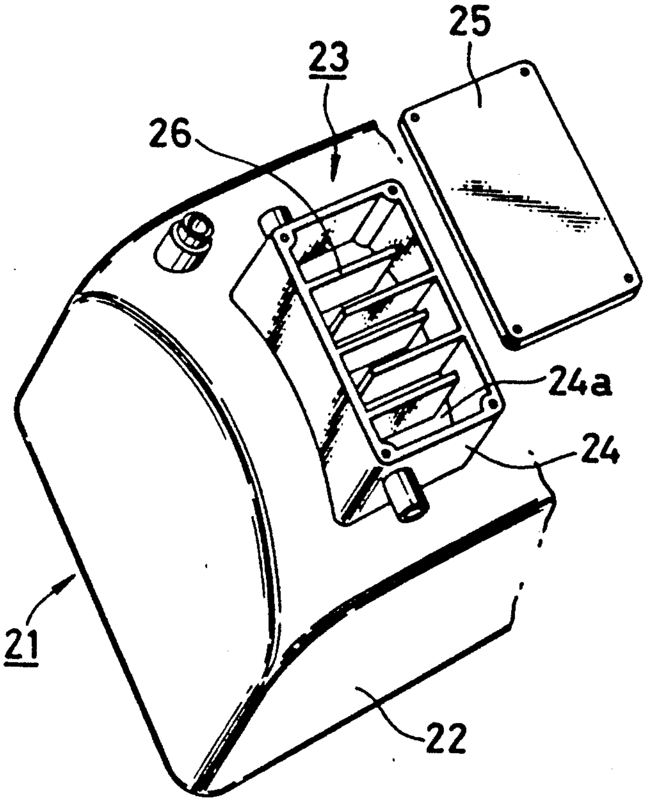
FIG. 2 is a perspective view showing essential parts of a headlamp for a vehicle, having an integrally formed maze box, according to another embodiment of the present invention.
Figure 3:
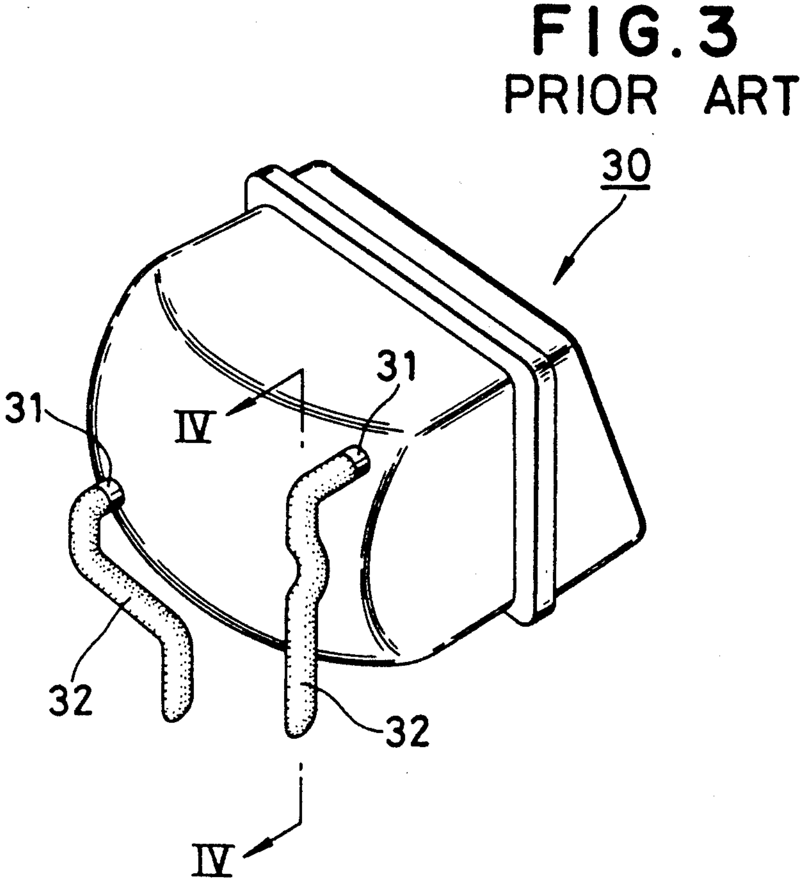
FIG. 3 PRIOR ART
FIG. 3 is a perspective view showing a conventional vehicle headlamp ventilation system.
Figure 4:
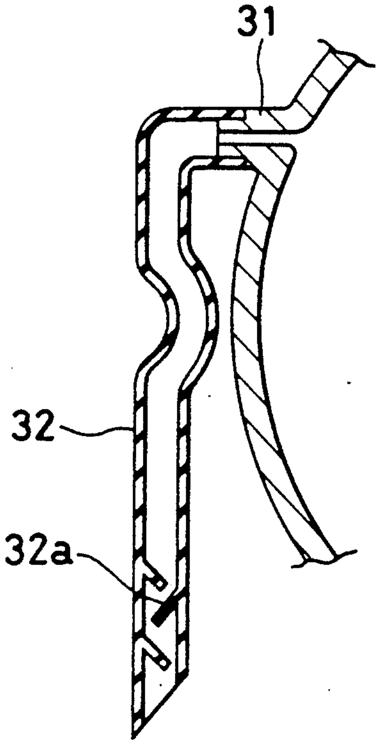
FIG. 4 PRIOR ART
FIG. 4 is a sectional view taken along line IV—IV of FIG. 3.

FIG. 2 shows a vehicle headlamp 21 according to a second embodiment which utilizes the aforementioned type of dust-resistant maze box 1. In the previous embodiment, the aforementioned dust-resistant maze box 1 is separately formed whereas in the second embodiment, a box 24 of a dust-resistant maze box 23 is formed integrally with a portion formed from a resin member such as a housing 22 of a vehicle headlamp 21. In this case, the box 24 has a bottom surface 24*a* which is common with the headlamp housing 22. The construction, function and effect of a cover 25, ribs 26 and the like are exactly the same as those corresponding elements of the previous embodiment, and therefore, a detailed description thereof is omitted.

Such formation as described above and as shown in FIG. 2 can simplify the step of assembling the vehicle headlamp 21.

As described above, according to the present invention, there is provided a dust-resistant maze box wherein a pair of rubber hose connections are provided on the opposite ends of a box having at one surface thereof an opening portion, ribs extending from the bottom surface of the box to the opening portion which prolong a spatial distance between the pair of rubber hose connections are provided interior of the box, and the opening portion is closed by a cover. In addition, the present invention also provides a vehicle headlamp wherein the dust-resistant maze box is formed integrally with headlamp housing. With this arrangement, the ventilation system of the vehicle headlamp can be made to have an extremely long spatial distance within the limited mounting space in a vehicle. The present invention has excellent effects in that open air is sucked in via the aforesaid long spatial distance defined by the maze box whereby the rate of precipitation of dust in the midst thereof is enhanced to reduce an occurrence of a blur interiorly of the headlamp and to thereby prevent deterioration of performance.

What is claimed is:

1. A dust-resistant vehicle headlamp ventilation system for use with a vehicle headlamp having at least one ventilation opening, the ventilation system being provided on a rear side of the headlamp behind a reflector of the headlamp and outside of the headlamp, the ventilation system comprising:

a generally rectangular shaped maze box having a bottom surface, opposite sides, opposite ends, and an interior defined between said bottom surface, sides and ends, said box having a wider width than the largest cross sectional dimension of said at least one ventilation opening of said headlamp;

said box having an opening portion opposite said bottom surface, and a cover for closing said opening portion;

a pair of hose connections at said opposite ends of said box and communicating with the interior of said box;

a plurality of ribs provided interiorly of said box and extending alternately from said opposite sides of said box and ending short of the side from which the respective ribs do not extend, said ribs extending from said bottom surface to said opening portion and said ribs contacting said cover when said cover closes said opening portion, whereby said ribs define a maze-like elongated zig-zag air flow path interior of said box and between said pair of hose connections for prolonging a spatial distance between said pair of hose connections; and means for communicating at least one of said hose connections with said at least one ventilation opening of said headlamp.

2. The vehicle headlamp ventilation system of claim 1, wherein said vehicle headlamp comprises a housing having said at least one ventilation opening therein, and wherein said maze box is formed integrally with said housing of said vehicle headlamp.

3. The vehicle headlamp ventilation system of claim 2, wherein said housing of said headlamp has a surface which also serves as said bottom surface of said box, said sides and ends of said box extending from said headlamp housing.

4. The vehicle headlamp ventilation system of claim 2, wherein said communication means comprises a hose connecting said at least one ventilation opening to one of said hose connections of said box, whereby air enters said box via said other hose connection, passes through said zig-zag air flow path, passes through said hose, and then to the interior of said headlamp housing via said at least one ventilation opening.

5. The vehicle headlamp ventilation system of claim 1, wherein said communicating means comprises a hose connecting said at least one ventilation opening to one of said hose connections of said box, whereby air enters said box via said other hose connection, passes through said zig-zag air flow path, passes through said hose, and then to the interior of said headlamp via said at least one ventilation opening.

6. The vehicle headlamp ventilation system of claim 1, wherein said maze box is formed separately from said headlamp, and is attached thereto.

* * * * *